(12) United States Patent
Cambron et al.

(10) Patent No.: US 11,097,475 B2
(45) Date of Patent: Aug. 24, 2021

(54) METHODS AND SYSTEMS FOR 3D PRINTING WITH A 3D PRINTING PLATFORM INCLUDING PRINTING TOOL COUPLING COMPONENTS

(71) Applicant: Advanced Solutions Life Sciences, LLC, Louisville, KY (US)

(72) Inventors: Scott Douglas Cambron, Louisville, KY (US); Dakota Waldecker, Louisville, KY (US)

(73) Assignee: ADVANCED SOLUTIONS LIFE SCIENCES, LLC, Louisville, KY (US)

( * ) Notice: Subject to any disclaimer, the term of this patent is extended or adjusted under 35 U.S.C. 154(b) by 347 days.

(21) Appl. No.: 16/152,680

(22) Filed: Oct. 5, 2018

(65) Prior Publication Data

US 2019/0105833 A1    Apr. 11, 2019

Related U.S. Application Data

(60) Provisional application No. 62/569,077, filed on Oct. 6, 2017.

(51) Int. Cl.
*B29C 64/227* (2017.01)
*B33Y 30/00* (2015.01)
*B29C 64/245* (2017.01)
*B33Y 40/00* (2020.01)
*B29C 64/336* (2017.01)
(Continued)

(52) U.S. Cl.
CPC .......... *B29C 64/227* (2017.08); *B29C 64/241* (2017.08); *B29C 64/245* (2017.08); *B29C 64/321* (2017.08); *B29C 64/336* (2017.08); *B33Y 30/00* (2014.12); *B33Y 40/00* (2014.12)

(58) Field of Classification Search
None
See application file for complete search history.

(56) References Cited

U.S. PATENT DOCUMENTS

| | | |
|---|---|---|
| 2015/0140151 A1 | 5/2015 | Schmehl et al. |
| 2016/0095959 A1 | 4/2016 | Bonassar et al. |
| 2016/0214321 A1 | 7/2016 | Tow et al. |

(Continued)

OTHER PUBLICATIONS

International Search Report and Written Opinion dated Feb. 4, 2019 relating to International Application No. PCT/US2018/054563.

*Primary Examiner* — Robert J Grun
(74) *Attorney, Agent, or Firm* — Dinsmore & Shohl, LLP

(57) ABSTRACT

Methods and systems for 3D printing use a 3D printing device defined by a polar coordinate frame including an r-axis, a z-axis, and a rotational theta axis. The device includes a base, a rotatably attached printing stage is rotatably attached, a z-axis aligned pair of towers, an r-axis aligned rail slidably coupled to the towers, a print head slidably disposed on the rail, a printing tool coupling component ("master") joined to the print head, and a rotatable tool carousel with bays housing printing tools, each including a printing tool body ("slave"). The slave may be coupled with and locked to or unlocked from the master to form a coupled tool assembly through a mechanical actuation assembly. With the coupled tool assembly, a printing tool is removable from a respective bay when the coupled tool assembly moves along the r-axis in a direction opposite from the rotatable tool carousel.

11 Claims, 13 Drawing Sheets

(51) Int. Cl.
  *B29C 64/241* (2017.01)
  *B29C 64/321* (2017.01)

(56) References Cited

U.S. PATENT DOCUMENTS

2016/0271873 A1* 9/2016 Albert .................. B29C 64/209
2017/0151713 A1   6/2017 Steele
2018/0345371 A1* 12/2018 Mamrak ................ B33Y 10/00

* cited by examiner

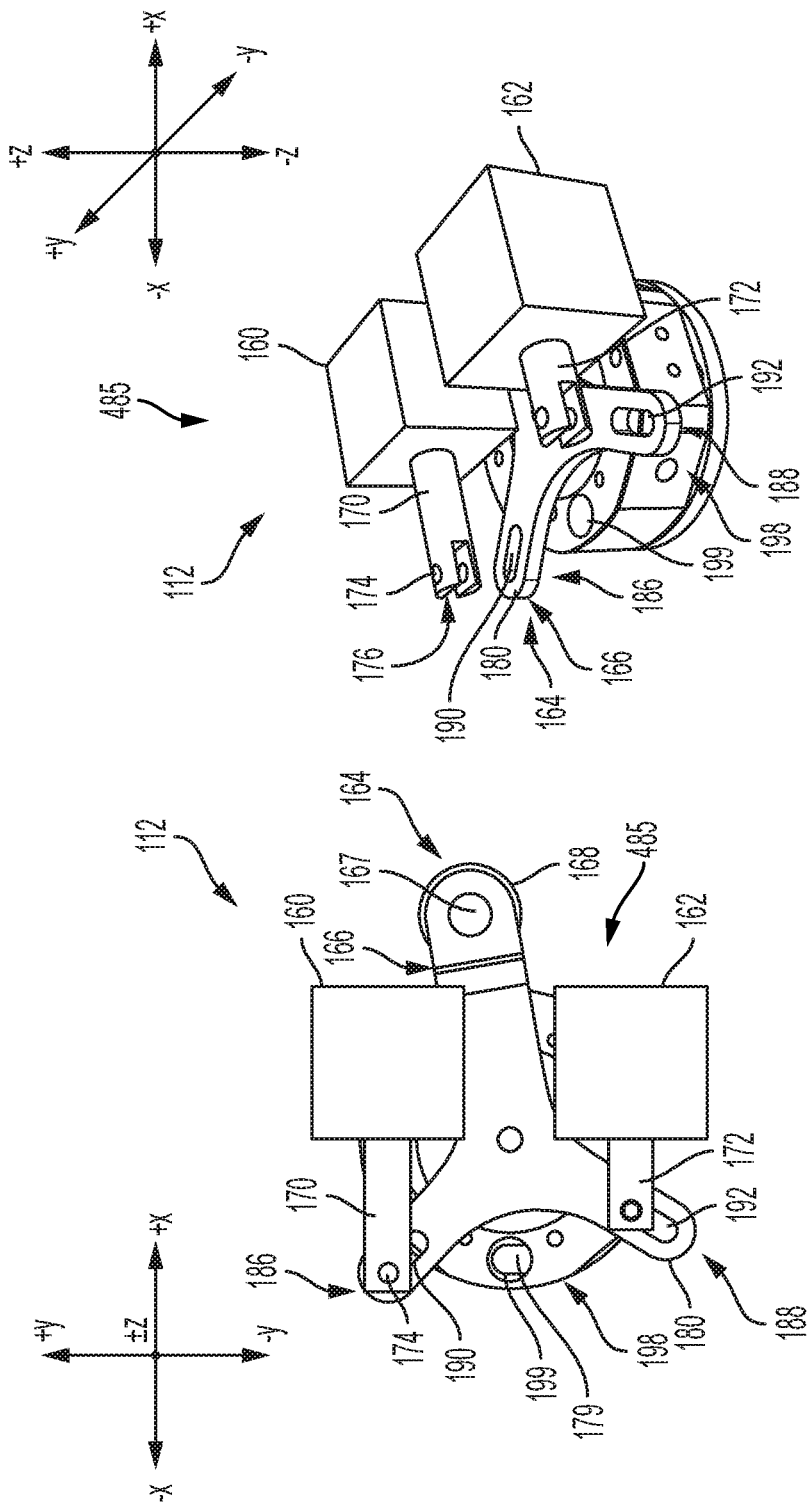

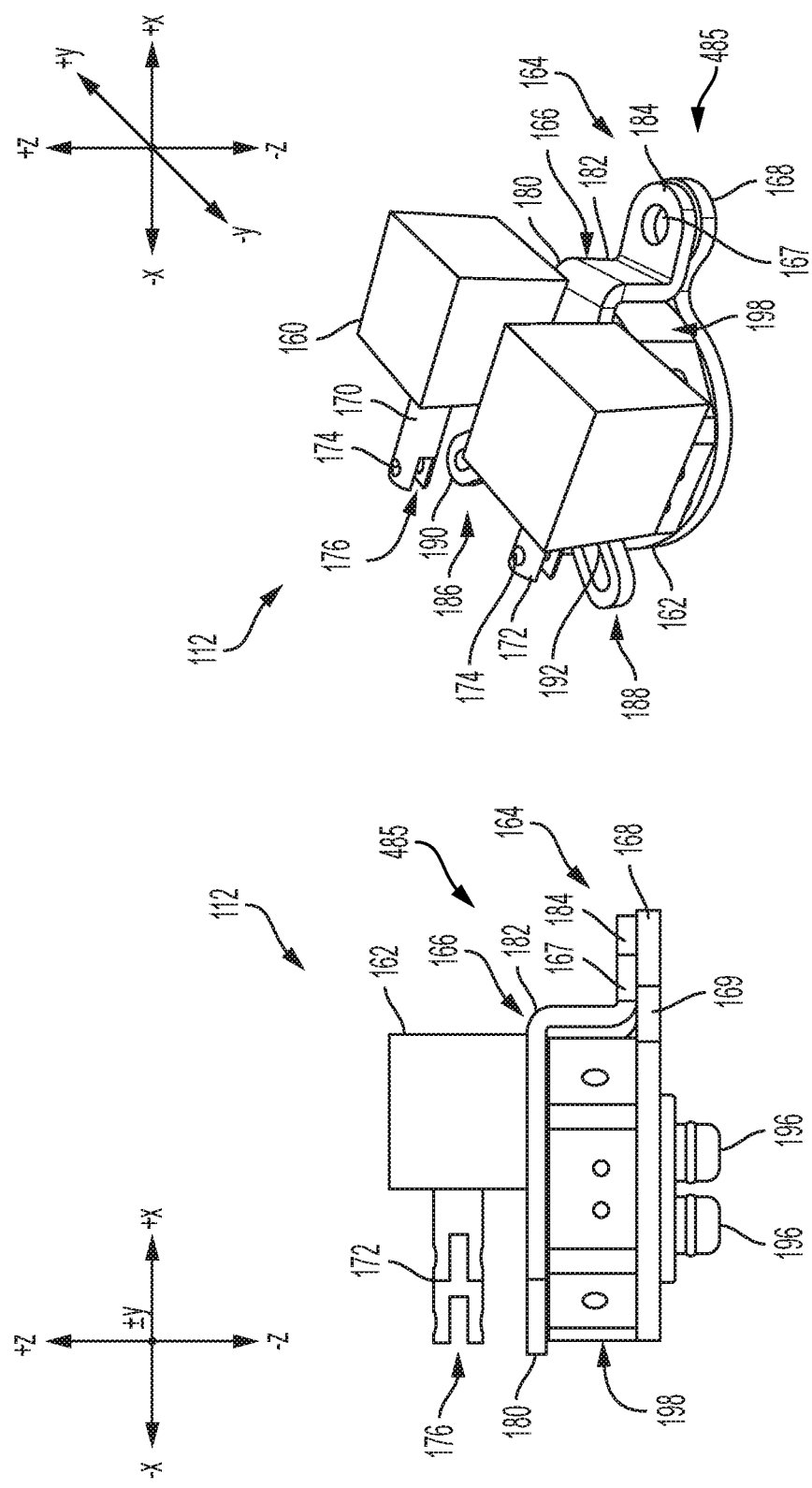

METHODS AND SYSTEMS FOR 3D PRINTING WITH A 3D PRINTING PLATFORM INCLUDING PRINTING TOOL COUPLING COMPONENTS

CROSS-REFERENCE TO RELATED APPLICATIONS

This application claims the benefit of U.S. Provisional Application Ser. No. 62/569,077, filed Oct. 6, 2017, the entirety of which is incorporated by reference herein.

BACKGROUND

Three-dimensional (3D) printing includes 3D printing devices that may be benchtop 3D devices and bioprinters that may include 3-axis linear actuators based on a Cartesian coordinate system. Such an architecture requires at least one drive motor, a linear actuator such as screw or belt drives, and at least a linear rail per axis. Such a configuration of motion translation often forces a footprint of the device to be 2-4 times larger than an actual print area.

Further, 3D bioprinters may print with multiple materials, requiring the device to be able to select a desired printing material from a bank of inventory tools. Efficient selection from the bank of inventory tools may reduce an overall print time of a designed bio-structure. Further, mechanical actuation technologies may be used for such selection and/or to assist with 3D printing on a 3D printing device. Such mechanical actuation technologies with a reduced cost and complexity may assist to make such devices more readily available and cost-effective. Accordingly, a need exists for alternative 3D printing devices and systems.

BRIEF SUMMARY

According to the subject matter of the present disclosure, a 3D printing device defined by a polar coordinate frame including an r-axis, a z-axis, and a rotational theta axis may include a base including a top surface, a rotary printing stage rotatably attached to the top surface of the base and configured to rotate between ends of the rotational theta axis, a pair of towers disposed along a pair of axes aligned with the z-axis, a rail disposed along the r-axis and slidably coupled to the pair of towers to slide along the z-axis, a print head slidably disposed on the rail, a master printing tool coupling component joined to the print head to form a first portion of a coupled tool assembly, and a rotatable tool carousel rotatably coupled to the base. The rotatable tool carousel may include a plurality of bays to removably house a respective plurality of printing tools, each printing tool including a printing tool body to form a second portion of the coupled tool assembly. The printing tool body may be configured to couple with the master printing tool coupling component to form the coupled tool assembly wherein the first portion of the coupled tool assembly is locked and coupled to the second portion of the coupled tool assembly such that the printing tool is removable from a respective bay of the plurality of bays that houses the printing tool when the coupled tool assembly moves along the r-axis in a direction opposite from the rotatable tool carousel.

In accordance with one embodiment of the present disclosure, a method for coupling 3D printing components of a 3D printing device defined by a polar coordinate frame including an r-axis, a z-axis, and a rotational theta axis may include aligning a top tool changer of a first portion of a coupled tool assembly with a bottom tool changer of a second portion of the coupled tool assembly along the z-axis in a wait position. The top tool changer may be housed in a bell crank assembly of the first portion of the coupled tool assembly, the bell crank assembly comprises a plurality of elongated, tapering receipt apertures defined in a bottom portion of the bell crank assembly, the top tool changer may be spaced from the bottom tool changer at a distance in the wait position, the bottom tool changer comprises a plurality of periphery protrusions disposed around a bottom tool changer periphery, and the top tool changer comprises a plurality of periphery apertures disposed around a top tool changer periphery and configured to receive the plurality of periphery protrusions in a receipt position. The method may further include lowering the top tool changer to the receipt position in which the plurality of periphery apertures of the top tool changer and the plurality of elongated, tapering receipt apertures of the bottom portion of the bell crank assembly receive the plurality of periphery protrusions of the bottom tool changer, and adjusting the bell crank assembly in the receipt position in a first direction to lock the top tool changer to the bottom tool changer in a locked position to form the coupled tool assembly wherein the first portion of the coupled tool assembly is locked and coupled to the second portion of the coupled tool assembly. The method may further include adjusting the bell crank assembly in the receipt position in a second direction opposite the first direction to unlock the top tool changer from the bottom tool changer in an unlocked position such that the first portion of the coupled tool assembly is able to decouple from the second portion of the coupled tool assembly.

In accordance with another embodiment of the present disclosure, a system for master printing tool coupling with a 3D printing device defined by a polar coordinate frame including an r-axis, a z-axis, and a rotational theta axis to removably couple with a printing tool may include a memory, one or more processors communicatively coupled to the 3D printing device and the memory, and machine readable instructions stored in the memory. The machine readable instructions may cause the system to perform at least the following when executed by the one or more processors: position a first portion of a coupled tool assembly slidably disposed on a rail of the 3D printing device aligned with the r-axis in a home position on the rail above a rotary printing stage of the 3D printing device; move the first portion of the coupled tool assembly along the rail to a wait position to await coupling with a second portion of the coupled tool assembly; position a first bay of a plurality of bays of a rotatable tool carousel adjacent the wait position to align with the r-axis through rotation of the rotatable tool carousel when another bay is adjacent the wait position; lower the rail along the z-axis to a receipt position in which a top tool changer of the first portion of the coupled tool assembly couples with a bottom tool changer of the second portion of the coupled tool assembly; and lock the top tool changer to the bottom tool changer to form the coupled tool assembly.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which:

FIG. 7A illustrates a top master-side view of the master printing tool coupling component of FIG. 6;

FIG. 7B illustrates a front-side isometric view of the master printing tool coupling component of FIG. 7A;

FIG. 7C illustrates a side view of the master printing tool coupling component of FIG. 7A;

FIG. 7D illustrates a back-side isometric view of the master printing tool coupling component of FIG. 7A;

DETAILED DESCRIPTION

Figure 1:
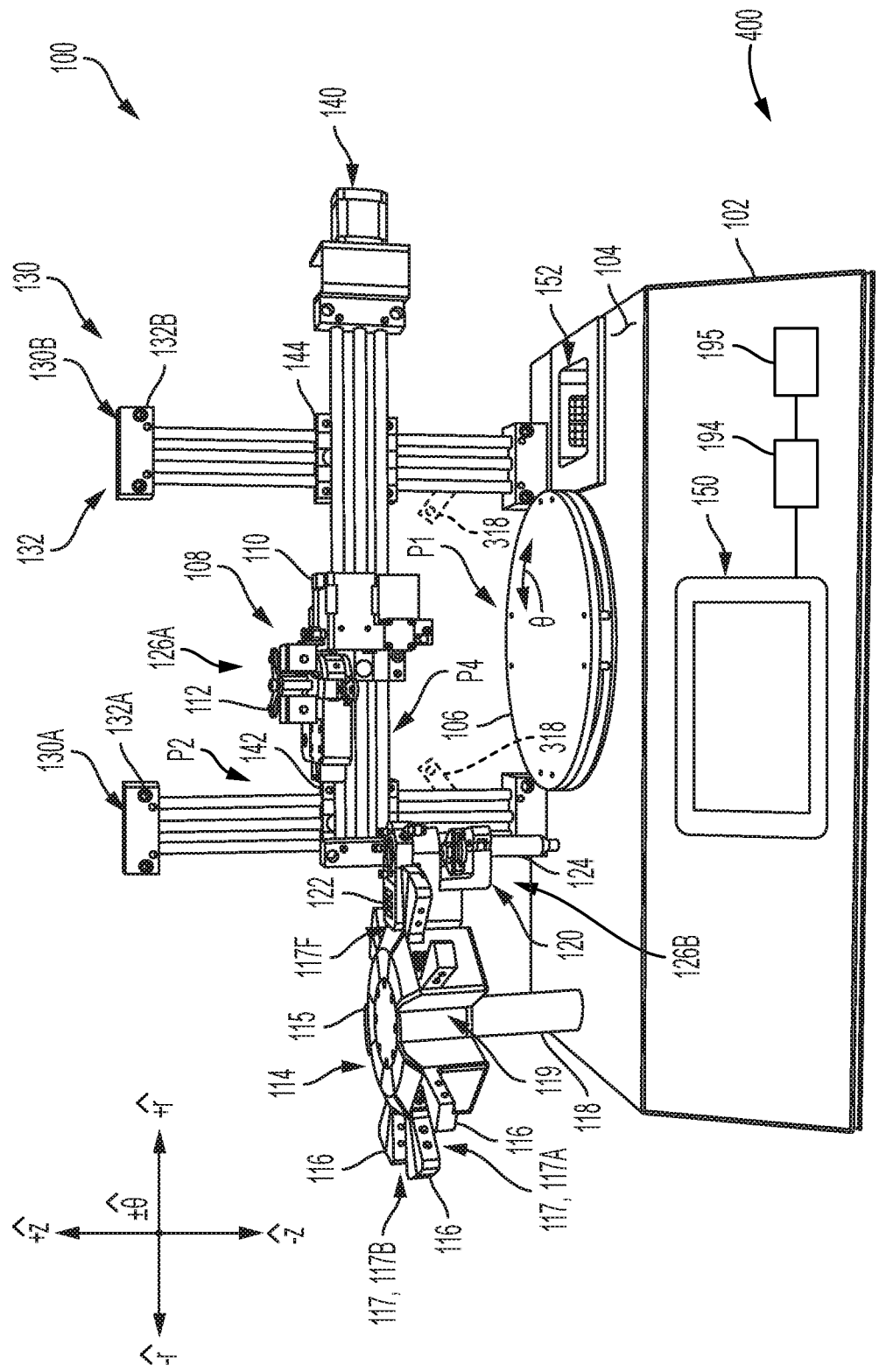
FIG. 1 illustrates a front perspective view of a 3D printing device on a polar coordinate plane and including a master printing tool coupling component joined to a print head and disposed at a home position above a rotary printing stage, and a printing tool body joined to a printing tool disposed in a bay of a rotatable tool carousel for retrieval by the master printing tool coupling component, according to one or more embodiments as described herein.

Referring initially to FIGS. 1-4, a 3D printing device 100 defined by a polar coordinate frame including an r-axis $\hat{r}$, a z-axis $\hat{r}$, and a rotational theta axis $\hat{\theta}$. Such a polar coordinate frame utilizing a cylindrical coordinate system (ROZ) is able to be implemented on the 3D printing device 100 to print 3D structures and incorporates two linear drive systems along the respective R and Z axes and a rotation axis defined by $\theta$ for rotation about the Z axis. A rotation may operate through use of a drive motor directly attached to a rotatable print platen (i.e., stage for 3D printing) through a gear set or belt/pulley system to reduce a number of drive assemblies and overall footprint to print area ratio of the 3D device over, for example, those operating with a Cartesian coordinate system. In embodiments, mechanical moving systems such as precision stepper motor screw drives or belt drives for R and Z axes and mechanical moving system such as a belt/pulley drive, gear set, or work drive on the $\theta$ axis may be powered by motor such as a stepper motor or a servo motor. The belt/pulley drive may provide for a suitable step per degree resolution per user request. In embodiments, the 3D printing device 100 may allow for up to 12 inches of travel in the Z-axis, 9 inches of print area on a rotary print stage described in greater detail further below, and up to 17 inches of travel in the R-axis to reach between a vision tip detection location and a rotatable carousel as described below.

As described herein, a forward-rearward (e.g., front-to-back) direction of the 3D printing device 100 is associated with the +/−$\hat{\theta}$-direction of a polar coordinate frame depicted in FIGS. 1-4. An upward-downward (e.g., top-bottom) direction of the 3D printing device 100 is associated with the +/−$\hat{z}$-direction depicted in FIGS. 1-4. A lateral direction of the 3D printing device 100 is associated with the +/−$\hat{r}$-direction depicted in FIG. 1, and is transverse to the forward-rearward direction. A positive (+) $\hat{r}$-direction faces toward a lateral portion that is to the right of the front of the 3D printing device 100, and a negative (−) $\hat{r}$-direction faces toward a lateral portion that is to the left of the front of the 3D printing device 100.

Further, the terms "front," "forward," "inward," "inner," "upward," "downward," "rear," "rearward," "outward," and "outer" are used herein to describe the relative positioning of various components of the 3D printing device 100. Such components are described in greater detail further below with respect to a Cartesian coordinate frame of FIGS. 5-11, in which a described forward-rearward (e.g., front-to-back) direction is associated with the −/+X-direction of the Cartesian coordinate frame depicted in FIGS. 5-11, which includes a similar alignment to the +/−$\hat{\theta}$-direction of a polar coordinate frame depicted in FIGS. 1-4. An upward-downward (e.g., top-bottom) direction is associated with the +/−Z-direction of the Cartesian coordinate frame depicted in FIGS. 5-11, which includes a similar alignment to the +/−$\hat{z}$-direction of a polar coordinate frame depicted in FIGS. 1-4. A lateral direction is associated with the −/+Y-direction of the Cartesian coordinate frame depicted in FIGS. 5-11, which includes a similar alignment to the +/−$\hat{r}$-direction of a polar coordinate frame depicted in FIGS. 1-4, and which is transverse to the forward-rearward direction. A negative (−) Y-direction faces toward a lateral portion that is to the right of a front frame section, and a positive (+)Y-direction faces toward a lateral portion that is to the left of the front frame section.

The 3D printing device 100 is configured to be a portable benchtop device capable of operating as a 3D bioprinter and configured to dispense and print with a variety of printing materials through methods including, but not limited to, pneumatic dispensing, mechanical dispensing, jetting electrospinning, and fused deposition modeling (FDM). Printing components of the 3D printing device 100, described in greater detail further below, traverse the 3D printing device 100 via cylindrical coordinates.

The 3D printing device 100 includes a base 102 including a top surface 104. The 3D printing device 100 further includes a rotary printing stage 106 that is rotatably attached to the top surface 104 of the base 102 and is configured to rotate between ends of the rotational theta axis $\hat{\theta}$ about rotational angle θ. In embodiments, the rotary printing stage 106 may be heated or cooled. As a non-limiting example, a print bed of the rotary printing stage 106 includes a heating and/or cooling unit that may be integrated therein. A 3D scanning unit 318 may cooperate with and be directed toward the rotary printing stage 106 and may include 3D scanners utilizing 3D scanner technologies such as, but not limited to, photogrammetry, structured light, time of flight (TOF), laser scanning, contact, or combinations thereof. The 3D printing device 100 may cooperate with a camera-based detection and calibration system which may include, for example, a three degrees of freedom (3-DOF) camera tip detect system to determine a precise location of an end of each tip after tool pickup, which tool may include an FDM tool that is stationary and permanently attached to a print head. In embodiments, the base 102 may house in an instrumentation/pneumatics enclosure communicatively coupled components such as a power supply, a general purpose input/output (GPIO) interface, a proportional regulator valve, a display 150, a tip detect location 152, one or more processors 194 that may include a motor controller, and a memory 195, as described in greater detail further below. The display 150 may include a touchscreen graphical user interface (GUI) and be a liquid crystal display (LCD).

The rotary printing stage 106 may be disposed between and generally forward of a pair of towers 130 including a first tower 130A and a second tower 130B. The pair of towers 130 are disposed along a pair of axes respectively aligned with the z-axis $\hat{z}$. The 3D scanning unit 318 may include components attached to the pair of towers 130 and directed to the rotary printing stage 106 for scanning as illustrated in FIG. 1 such that the 3D printing device 100 includes integrated 3D scanning capability.

The first tower 130A and the second tower 130B may respectively include a stop 132A, 132B at respective top ends that each have a top end width that is greater than an intermediate portion width of an intermediate portion of each of the first tower 130A and the second tower 130B. The pair of towers 130 extend from the top surface 104 of the base 102 and may extend from mounts disposed on the top surface 104 of the base 102. The pair of towers 130 may be integrally attached to the base 102 as a monolithic feature or may be attached as a modular feature fastened or otherwise attached to the base 102. In additional or alternative embodiments, the pair of towers 130 may extend upwardly from other portions of the base 102, such as a rear base portion.

A rail 140 is disposed along the r-axis $\hat{r}$ and is slidably coupled to the pair of towers 130 to slide along the z-axis $\hat{z}$. The pair of towers 130 are configured to provide stability for the rail 140. The rail 140 may be slidably coupled to the pair of towers 130 through rail mounts 142, 144 on respective first and second towers 130A, 130B. The stops 132A, 132B are configured to provide a stopping point against which the rail 140 may no longer slide upward with respect to the pair of towers 130. A first portion of a coupled tool assembly 126A is configured to be slidably disposed on the rail 140 and includes a print head assembly 108 and a master printing tool coupling component 112. The pair of towers 130 may be dual Z-axis motor assembly towers configured to move the print head assembly 108 up and down the 3D printing device 100. An R-axis motor assembly may further move the print head assembly 108 on the rail 140 across an equator of the rotary printing stage 106 to an outer perimeter of the rotary printing stage 106, and from the rotatable tool carousel 114 to a non-contact camera based tip detect system at the tip detect location 152. The tip detect location 152 may be at an end opposite from the rotatable tool carousel 114. The print head assembly 108 includes a print head 110 that is slidably disposed on the rail 140. The print head assembly 108 may include a high temperature FDM for operation at up to, for example, 500° C., to provide a hot end configured for printing of thermoplastic filament materials available in a filament spool form factor. The master printing tool coupling component 112 is joined to the print head 110 to form the first portion of the coupled tool assembly 126A.

Figure 2:
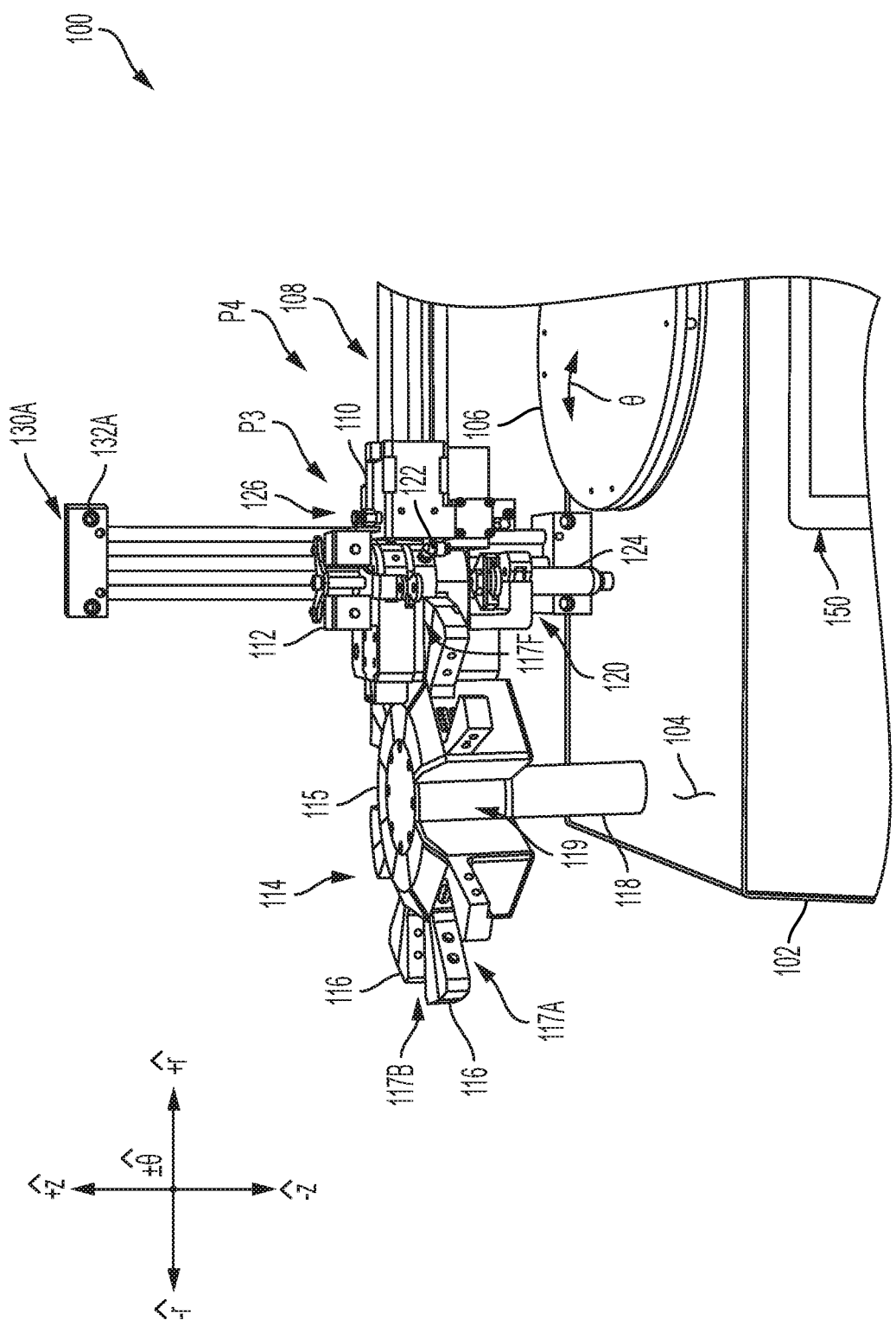
FIG. 2 illustrates a front-left portion of the 3D printing device of FIG. 1 when the master printing tool coupling component is coupled to the printing tool body retrieved with the printing tool from the rotatable tool carousel.
Figure 3:
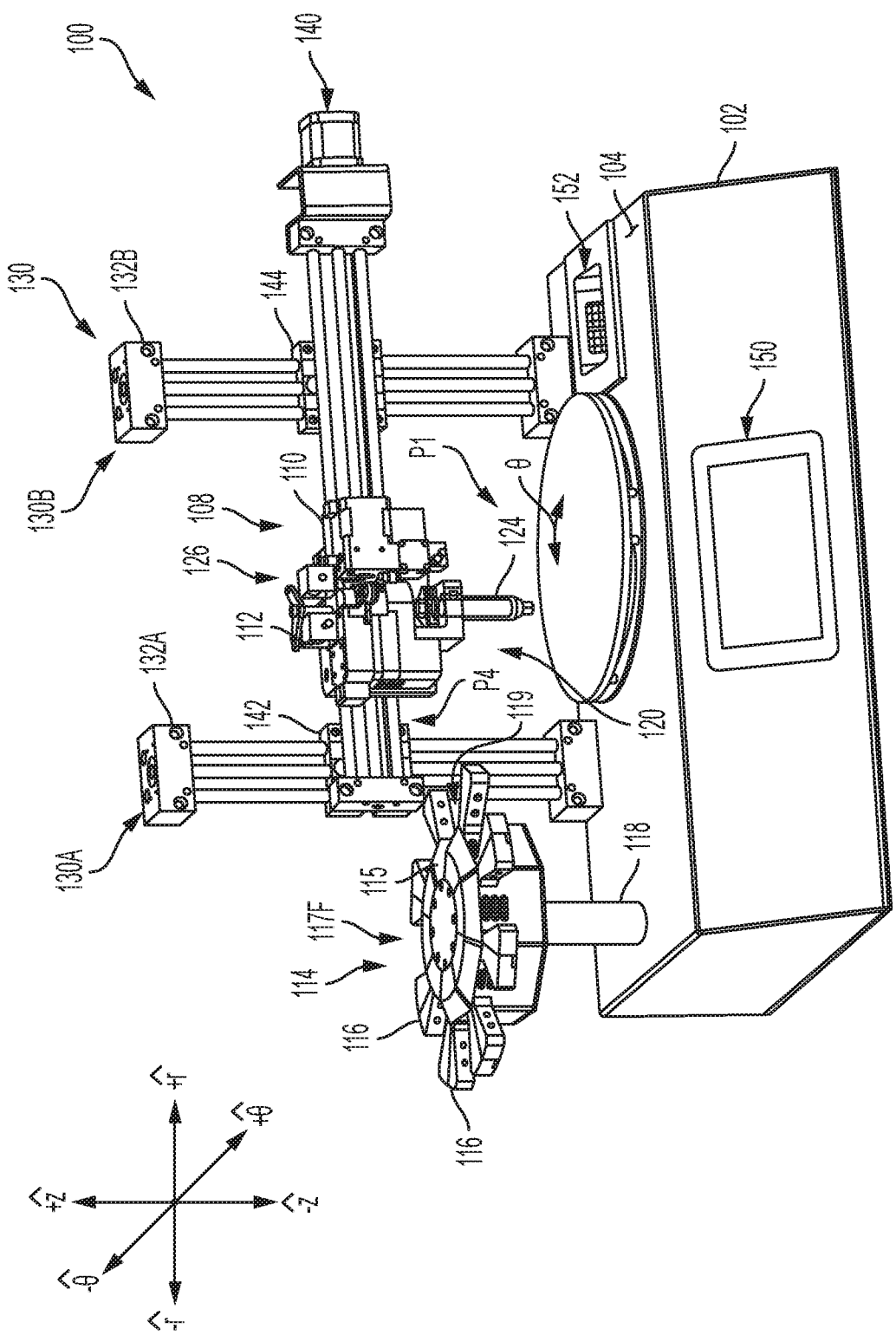
FIG. 3 illustrating a front-side isometric view of the 3D printing device of FIG. 1 when the master printing tool coupling component coupled to the printing tool body is disposed in a position near the home position and above the rotary printing stage.
Figure 4:
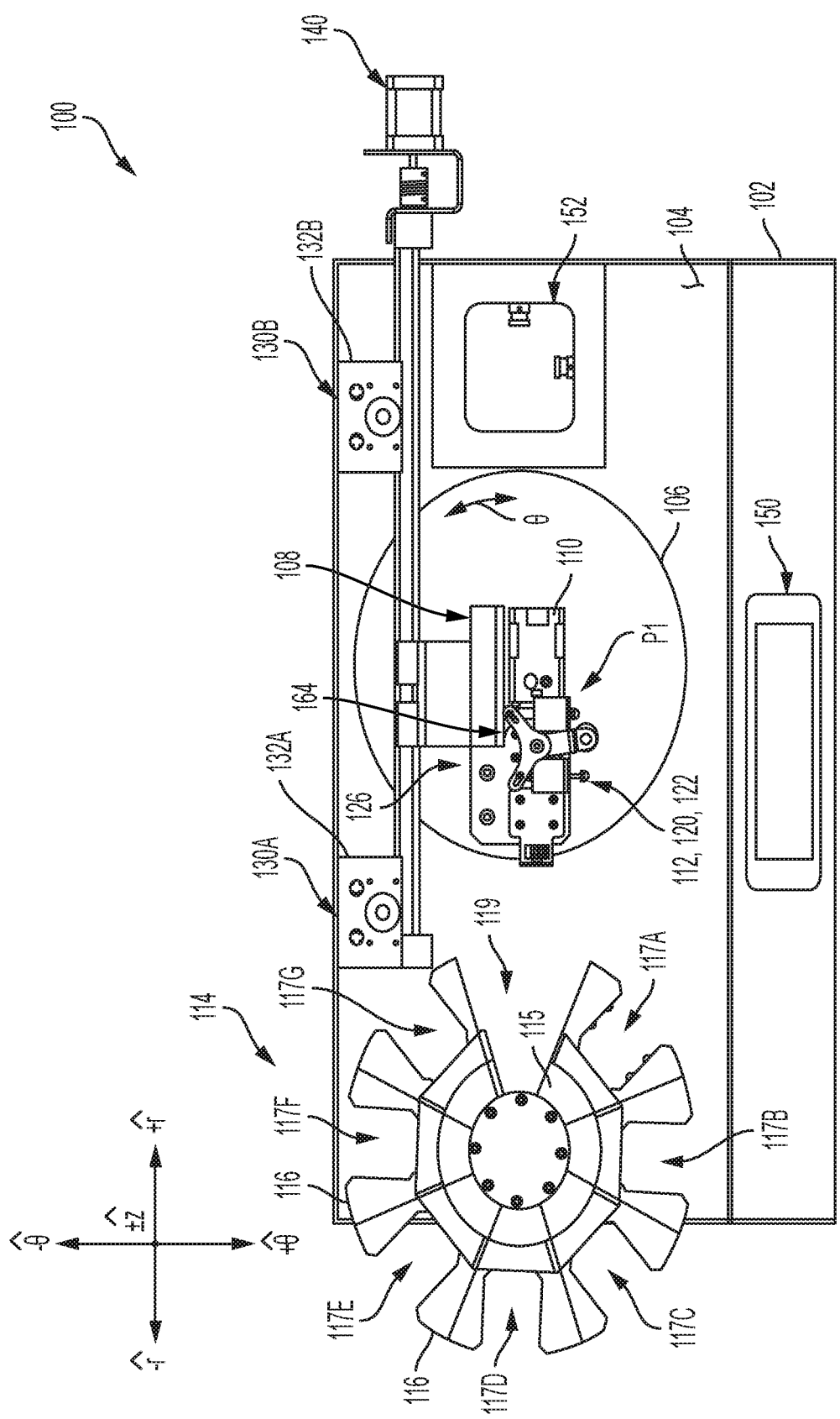
FIG. 4 illustrates a top plan view of the 3D printing device of FIG. 1 in the position of FIG. 3.
Figure 5:
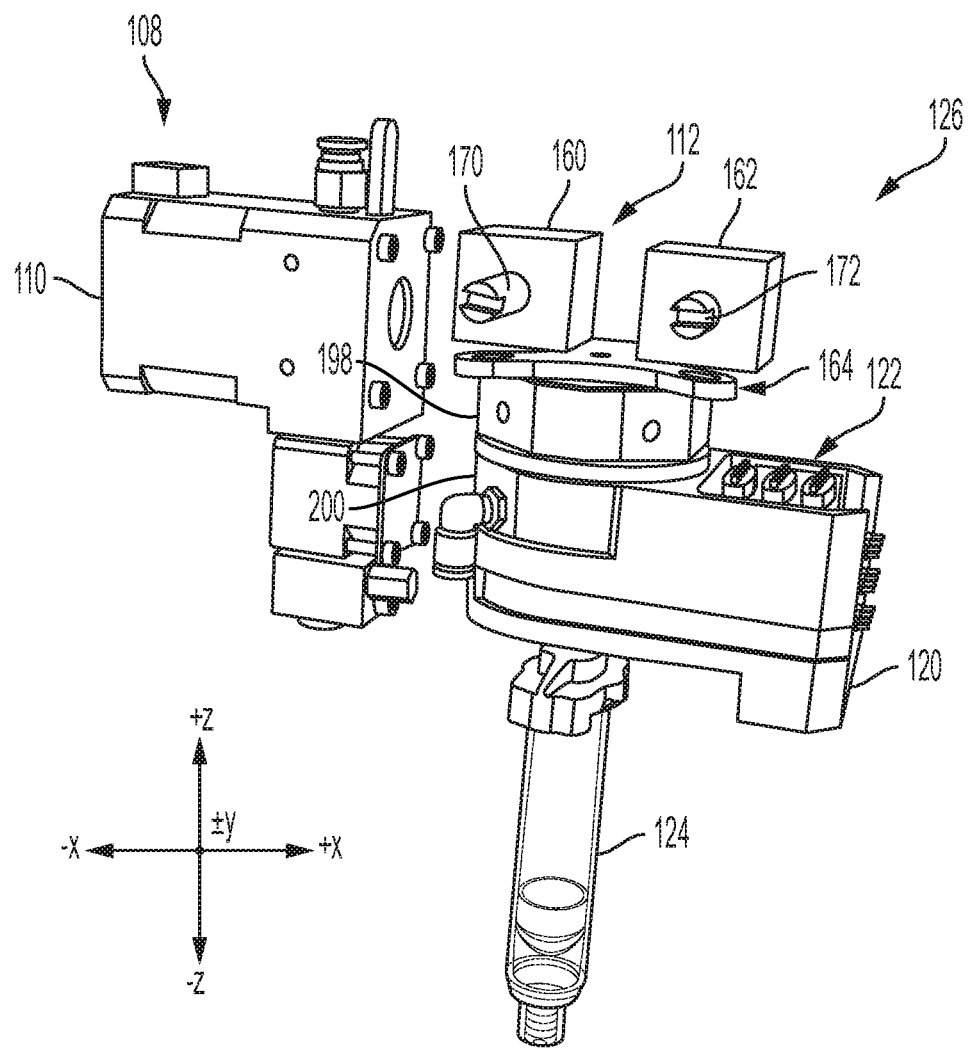
FIG. 5 illustrates an isometric view of an inverted coupled tool assembly including the print head and the master printing tool coupling component when coupled to the printing tool body and printing tool in a Cartesian coordinate plane for reference, and according to one or more embodiments as described herein.

A printing tool 120 including a printing tool body 122 forms a second portion of the coupled tool assembly 126B. The printing tool body 122 as described herein may encompass a printing and dispensing tool body. The printing tool 120 may additionally include a dispenser 124 that may be, for example, a pneumatic dispense. The second portion of the coupled tool assembly 126B is configured to couple with and lock to the first portion of the coupled tool assembly 126A to form a coupled tool assembly 126, as illustrated in FIGS. 2-4 and described in greater detail further below. In an embodiment, a dual print head configuration may be employed with the 3D printing device 100 to print biomaterials within the pneumatic dispenser using one or more printing tools 120 alongside thermoplastic materials through, for example, a permanently mounted high temperature FDM print head. Such a fixed FDM print head may be mounted directly adjacent to the pneumatic dispenser. Other tool options may include a pneumatic free, mechanical dispense tool. The right side of FIG. 5 illustrates an example of a pneumatic dispensing head including the master printing tool coupling component 112 and configured to join with the print head assembly 108 (left side) that may include a combination print head 110. The pneumatic dispensing head may be plumbed through a proportional regulator valve configured to dynamically and programmatically control a dispense pressure of the dispensed and printed material such that materials of a wide viscosity may effectively be dispense and printed. A mechanical dispense operation may additionally or alternatively may utilized to allow and expand a material deposition while allowing for control along with an ability to pull a vacuum for dispensing functionality. The master printing tool coupling component 112, illustrated in FIGS. 7A-7D and described in greater detail further below, is configured to engage and/or disengage a variety of tool bodies and/or end effectors of one or more printing tools 120 housed in the rotatable tool carousel 114.

A rotatable tool carousel 114 is rotatably coupled to the base 102. The rotatable tool carousel 114 may be rotatably attached to a drive shaft 118 that extends from the top surface 104 of the base 102. The rotatable tool carousel 114 includes a plurality of bays 117 to removably house and attach to a respective plurality of printing tools 120. The plurality of printing tools 120 may include, but not be limited to, FDM, ambient dispense tool, hot dispense tool including an initially resistive heater, cold dispense tool, dual or multi-barrel mixing, mechanical dispense tools, dual dispense tools, ultraviolet (UV) cure configured for independent control of a broad spectrum of UV wavelengths such as 365 nm, 385 nm, and 405 nm, and screw driven printing tools, or combinations thereof. As a non-limiting example, an FDM tool may stay on a printhead assembly of the printing tool 120 to mitigate a possibility of filament entanglement. The plurality of bays 117 are powered for quick rotation through rotation of the drive shaft 118. The plurality of bays 117 may be powered for off printhead power to maintain material temperatures, such as providing a cold tool hold at 5° C. such that collagen does not gel up. Each bay 117 may be configured to provide tool identification information as well when connected to a printing tool 120. In an embodiment, the drive shaft 118 is configured to rotate the rotatable tool carousel 114 through a connection to a drive powered by a motor, such as a belt/pulley drive, gear set, or worm drive powered via a stepper motor or servo motor. In an embodiment, the plurality of bays 117 may include seven bays 117A-G to respectively house seven printing tools 120. The rotatable tool carousel 114 may house printing tools 120 in a range of from two to seven printing tools 120, though other amounts of printing tools 120 housed by the rotatable tool carousel 114 and that may be based on overall design size parameters are contemplated by and within the scope of this disclosure.

As described above, each printing tool 120 includes the printing tool body 122 to form the second portion of the coupled tool assembly 126B. Each printing tool body 122 configured to couple with the master printing tool coupling component 112 of the first portion of the coupled tool assembly 126A to form the coupled tool assembly 126 such that the first portion of the coupled tool assembly 126A is locked and coupled to the second portion of the coupled tool assembly 126B in a locked position. In the locked position, the printing tool 120 is removable from a respective bay 117A-117G of the plurality of bays 117 that houses the printing tool 120 when the coupled tool assembly 126 moves along the r-axis r̂ in a direction opposite from the rotatable tool carousel 114.

The rotatable tool carousel 114 includes an interior support 115 from which a plurality of ledges 116 defining the plurality of bays 117 extend. A pair of end ledges 116 define a clearance bay 119. In embodiments, when the clearance bay 119 is aligned with the r-axis r̂, the rotatable tool carousel 114 is in a position to avoid interference with the rotary printing stage 106 during printing on the rotary printing stage 106 by the coupled tool assembly 126, as described in greater detail further below.

Figure 6:
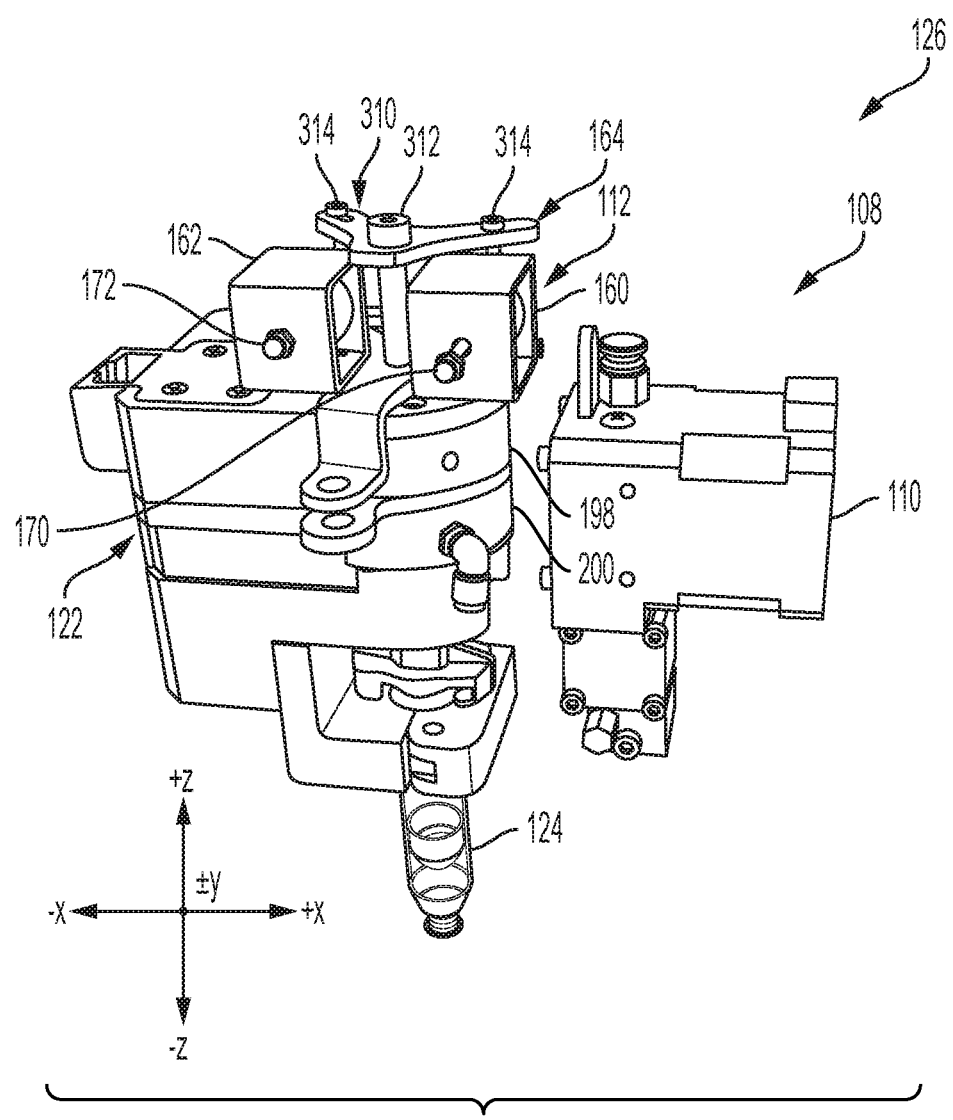
FIG. 6 illustrates an isometric view of another coupled tool assembly including the print head and the master printing tool coupling component when coupled to the printing tool body and printing tool in the Cartesian coordinate frame of FIG. 5.
Figure 8A:
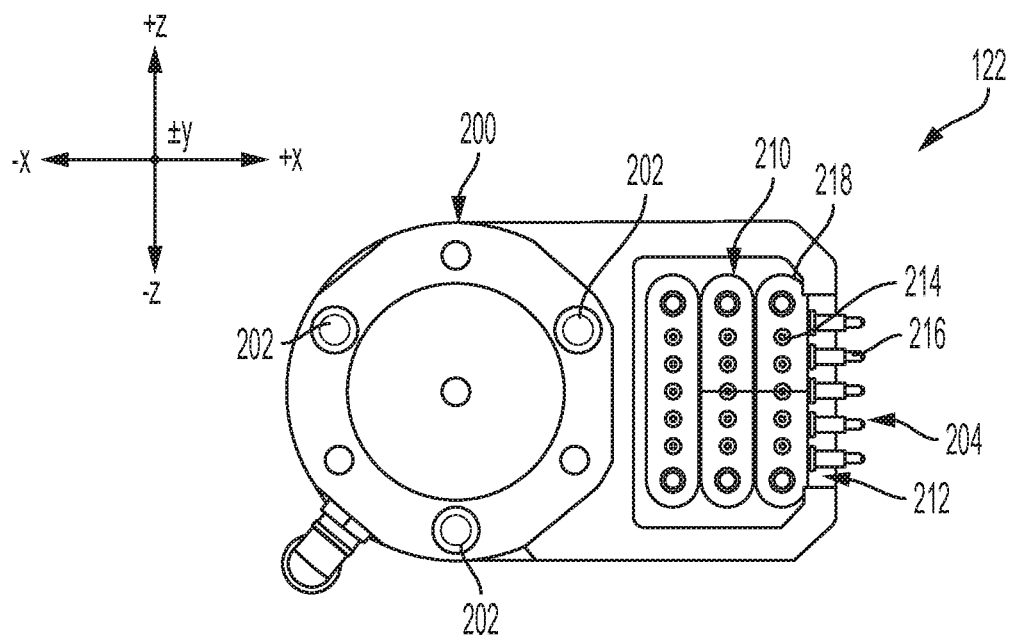
FIG. 8A illustrates a top slave-side view of the printing tool body of FIG. 6.
Figure 8B:
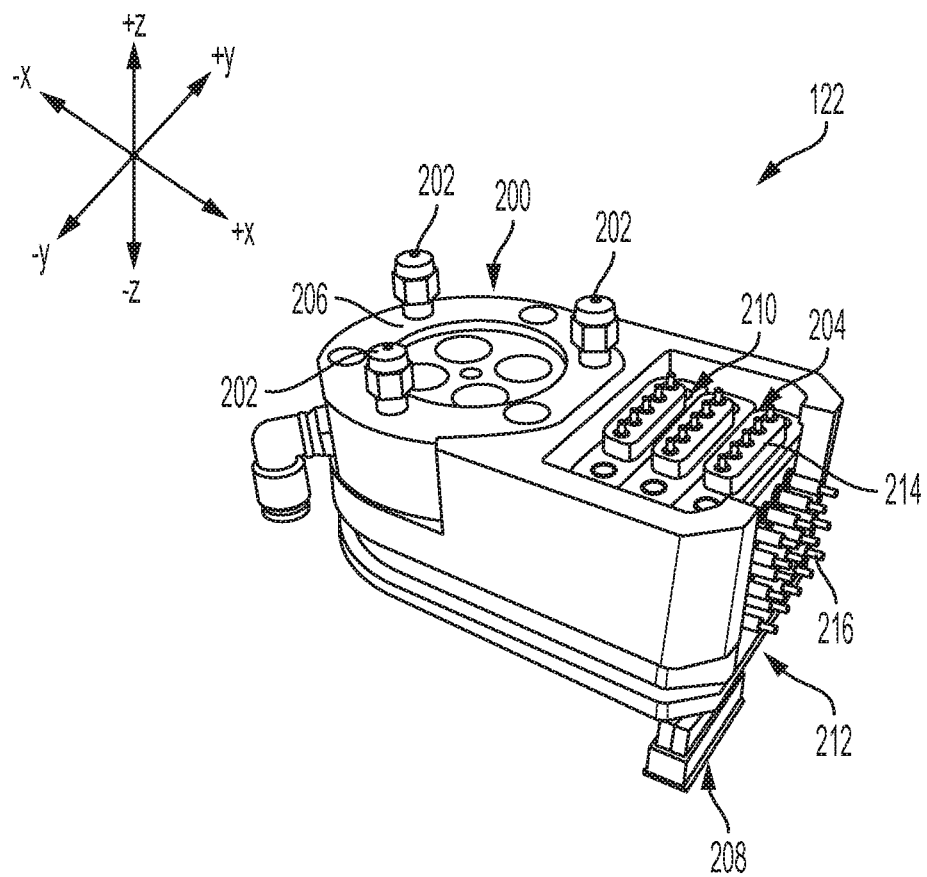
FIG. 8B illustrates an isometric view of the printing tool body of FIG. 8A.
Figure 8C:
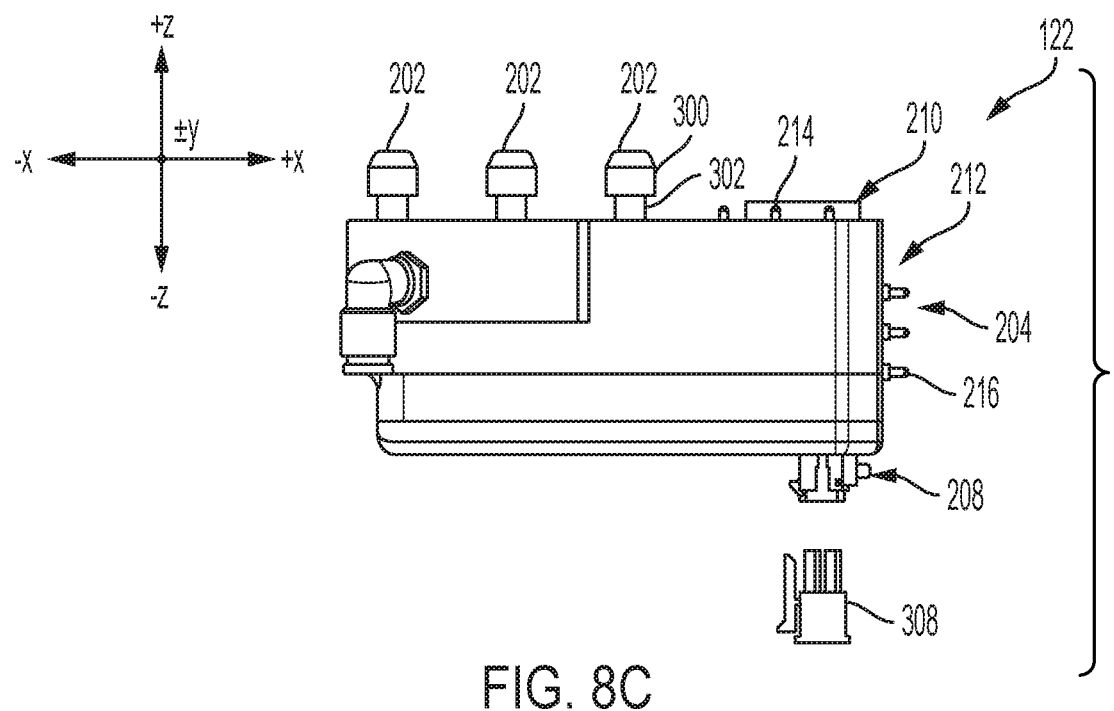
FIG. 8C illustrates a side view of the printing tool body of FIG. 8A.
Figure 8D:
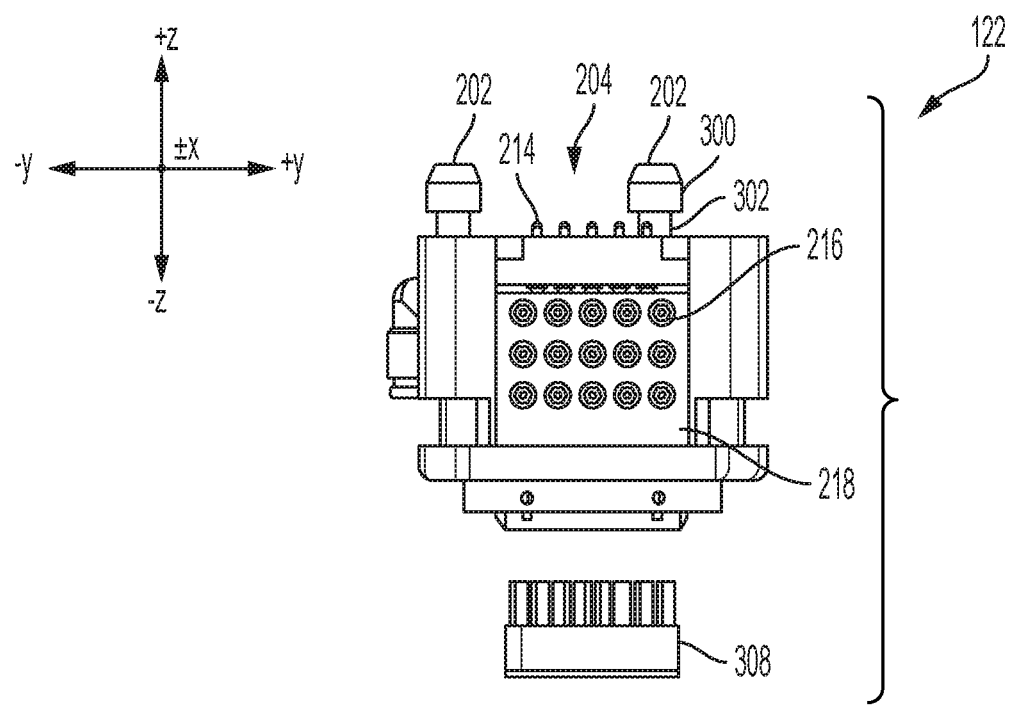
FIG. 8D illustrates a back view of the printing tool body of FIG. 8A.

Referring to FIGS. 6-7D, the first portion of the coupled tool assembly 126A further includes a bell crank assembly 164, as illustrated in FIGS. 6-7D. A top tool changer 198 is housed in the bell crank assembly 164. Referring to FIGS. 6 and 8A-8D, the second portion of the coupled tool assembly 126B includes a bottom tool changer 200 configured to couple with the top tool changer 198 of the first portion of the coupled tool assembly 126A. FIG. 5 illustrates an alternative, inverted embodiment of the coupled tool assembly 126 that may attach to a rotatable tool carousel 114 at an opposite right side of the base 102 of FIG. 1, such that the tip detect location 152 may be disposed at an opposite left side of the base 102.

In embodiments, the top tool changer 198 and the bottom tool changer 200 may be lever based tool changers configured to be locked or unlock with respect to each other through one or more mechanical actuation assemblies such as the bell crank assembly 164. It is contemplated within the scope of this disclosure that other mechanical actuation assemblies in addition or alternative to the bell crank assembly 164 may mechanically actuate motion of the top tool changer 198 with respect to the bottom tool chamber 200 when coupled together to lock or unlock the top tool changer 198 to the bottom tool changer 200. In embodiments, the other mechanical actuation assemblies may include a motor drive utilizing gears, belts, clutches, combinations thereof, and the like.

Referring to FIGS. 8A-8D, the printing tool body 122 includes the bottom tool changer 200 and is configured to integrate with tool application including, but not limited to, an ambient, heated, cooled, UV-curing, and/or mixing dual mixing printing tool 120. The bottom tool changer 200 may include a plurality of periphery protrusions 202 disposed around a bottom tool changer periphery. As illustrated in FIGS. 7A-7B, the top tool changer 198 may include a plurality of periphery apertures 199 disposed around a top tool changer periphery and configured to receive the plurality of periphery protrusions 202 (FIGS. 8A-8D).

In embodiments, the printing tool body 122 including the bottom tool changer 200 may include an electrical power module 204, an auxiliary power port 208 for communicative coupling with an auxiliary power supply 308, a master power connection 210 including top spring loaded pins 214, a carousel power connection 212 including side spring loaded pins 216, and at least a printed circuit board 218. The printing tool 120 that may be, for example, a print head, may be powered through the master power connection 210 through the top spring loaded pins 214 and on the rotatable tool carousel 114 through the side spring loaded pins 216 and the carousel power connection 212. Each bay 117 may be powered to provide power through the carousel power connection 212 when attached to the printing tool 120. In an embodiment, a total of fifteen (15) spring pins may be utilized to provide power and/or signals, though other amounts of spring pins are other contemplated within the scope of this disclosure. The spring pins 214, 216 may be press fit into or soldered to a corresponding printed circuit board 218. A bottom of a tool body of the printing tool 120 may include a set of holes configured for attachment to one or more other tools such as the dispenser 124. Such an interchangeable tool body permits ease of manufacturing and servicing. Further, the electrical power module 204 including spring pin arrays and corresponding printed circuit boards 218 may be housed within a modular housing of the tool body and configured for easy installation for assembly and removal for servicing. As a non-limiting example, if the spring pin arrays are damaged or need to be changed, the electrical power module 204 may be replaced rather than replacing the entire tool body housing the electrical power module 204.

Referring to FIGS. 6 and 7A-7D, the bell crank assembly 164 may include a bottom portion 168, a top portion 166, and an uppermost top component 310. In embodiments, at least one interior protrusion 196 (FIG. 7C) extending from the top tool changer 198 and the bottom portion 168 of the bell crank assembly 164 is received in at least one interior notch 206 of the bottom tool changer 200 sized to receive the at least one interior protrusion 196. The at least one interior protrusion 198 may be configured as a pneumatic port for pneumatic dispensing operations. A plurality of elongated, tapering receipt apertures 179 (FIGS. 7A and 11) are defined in a bottom portion of the bell crank assembly and are configured to receive the plurality of periphery protrusions 202 of the bottom tool changer 200 (FIGS. 8A-8D). It is contemplated within the scope of this disclosure that additional or alternative mechanical actuation assemblies may be utilized to lock or unlock the top tool changer 198 with respect to the bottom tool changer 200, such as one or more motor/clutch assemblies, one or more motor drive utilizing gears, belts, clutches, or combinations thereof.

Each of the plurality of periphery protrusions 202 of the bottom tool changer 200 may include a head portion 300 and a neck portion 302 disposed below, extending from or otherwise attached to the head portion 300. The head portion 300 has a head diameter that is larger than a neck diameter of the neck portion 302.

Further, each of the plurality of elongated, tapering receipt apertures 179 of the bottom portion 168 of the bell crank assembly 164 may include a taper portion 404 and a wider portion 406 (FIG. 11) to form a keyhole based locking mechanism. It is contemplated within the scope of this disclosure that additional or alternatively locking mechanisms with respect to the bell crank assembly 164 or other mechanical actuation assemblies may be utilized to lock or unlock the top tool changer 198 to the bottom tool changer 200. Each taper portion 404 has a taper portion width that is smaller than a wider portion width of each wider portion 406. The wider portion 406 may be configured to receive, along with a periphery apertures 199 of the top tool changer 198, the head portion 300 of one of the plurality of periphery protrusions 202 of the bottom tool changer 200. The taper portion width of each elongated, tapering receipt aperture 179 is also smaller than the head diameter of the head portion 300.

Figure 9:
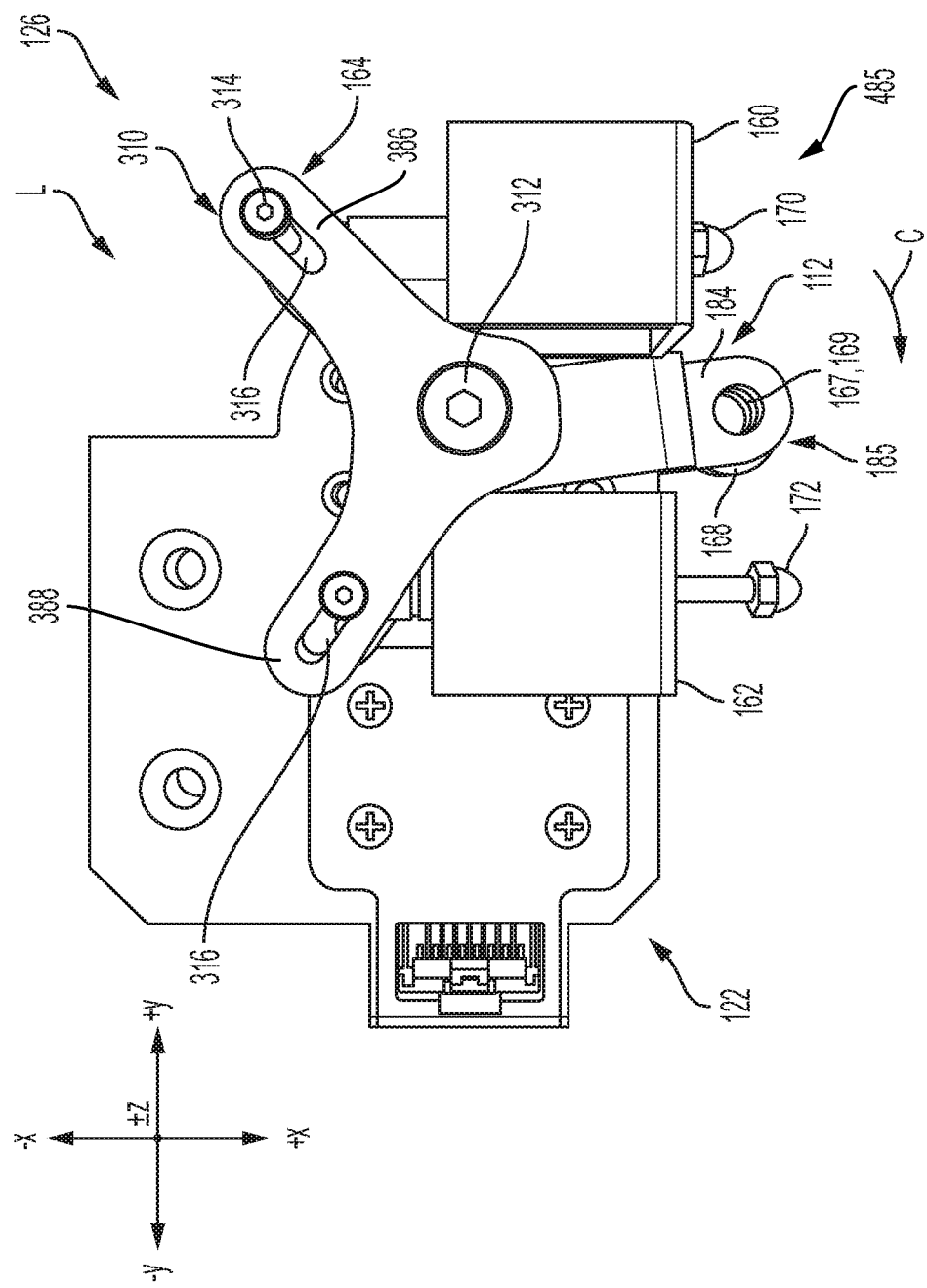
FIG. 9 illustrates a top view of the coupled tool assembly including the master printing tool coupling component in a locked position when coupled to the printing tool body of FIG. 6, according to one or more embodiments as described herein.
Figure 10:
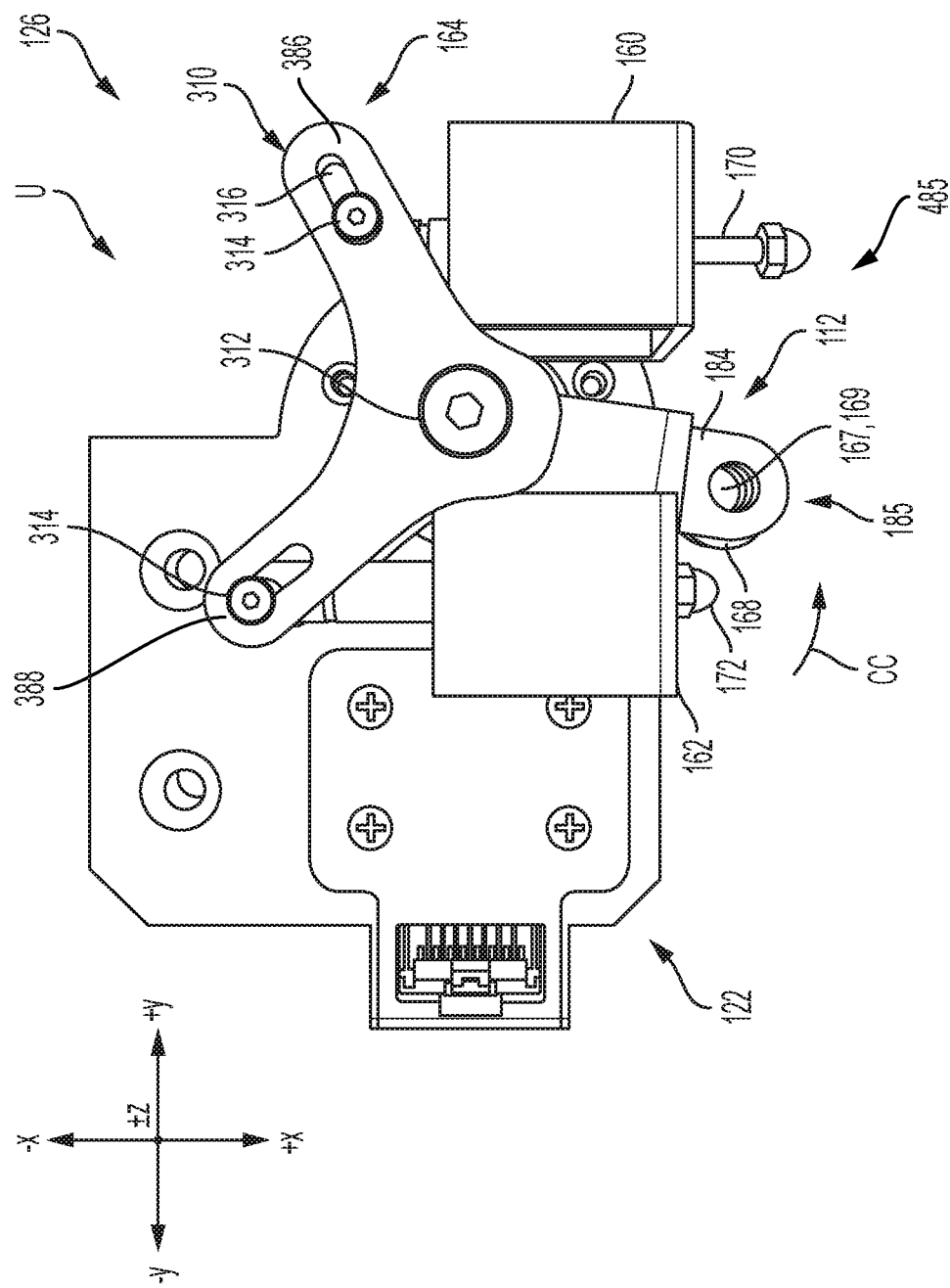
FIG. 10 illustrates a top plan view of the coupled tool assembly including the master printing tool coupling component in an unlocked position when coupled to the printing tool body of FIG. 6, according to one or more embodiments as described herein.
Figure 11:
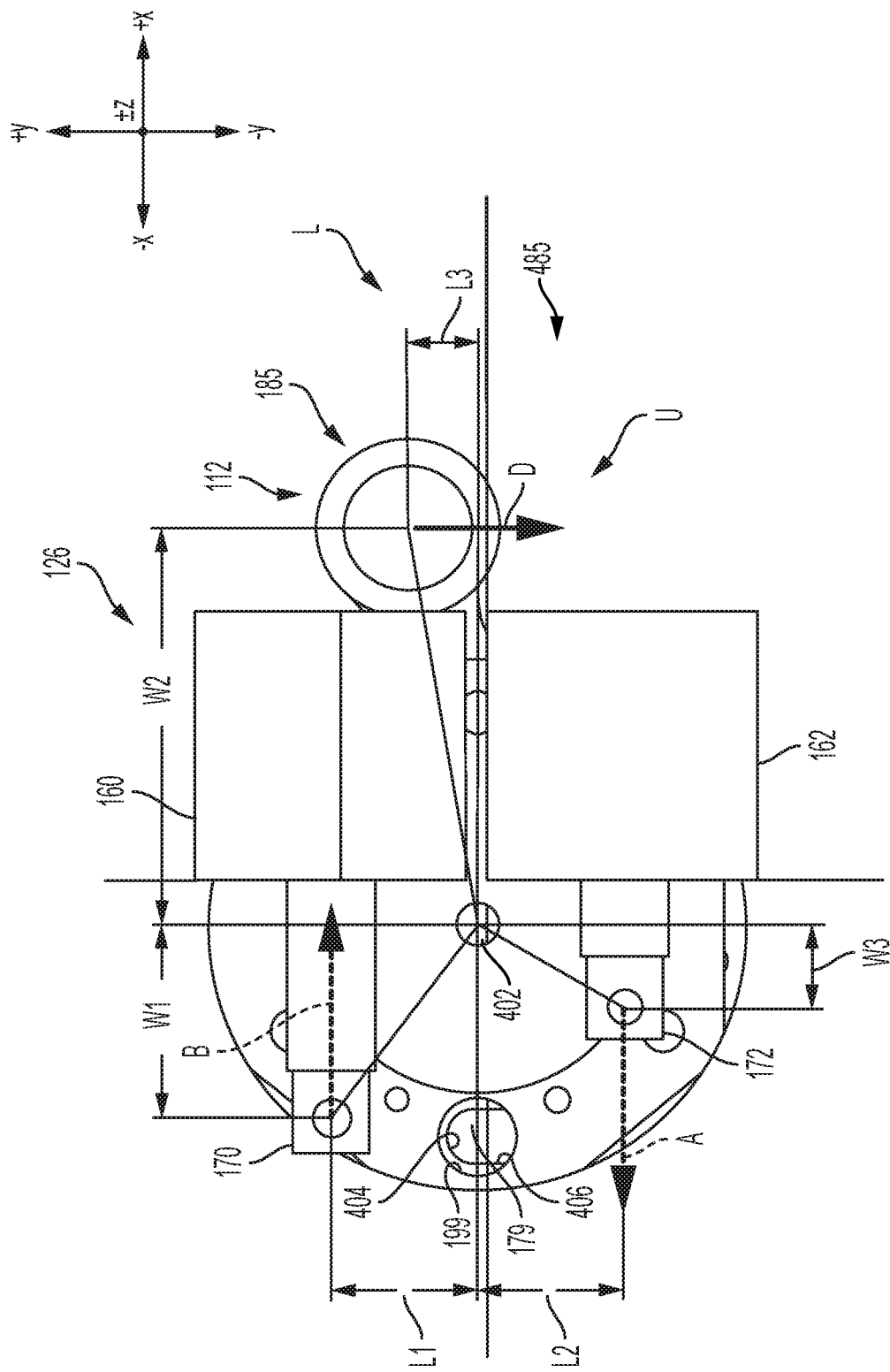
FIG. 11 illustrates a top cross-sectional view of the master printing tool coupling component adjustable between the respective lock and unlocked positions of FIGS. 9-10 to depict resultant force transfers, according to one or more embodiments as described herein.

Referring to FIGS. 7A, 9, and 11, in a locked position L, each neck portion 302 (FIG. 8C) of each of the plurality of periphery protrusions 202 of the bottom tool changer 200 abuts walls defining the taper portion 404 of the respective plurality of elongated, tapering receipt apertures 179 of the bottom portion 168 of the bell crank assembly 164. Referring to FIG. 10, in an unlocked position U, each neck portion 302 (FIG. 8C) of each of the plurality of periphery protrusions 202 of the bottom tool changer 200 is spaced from walls defining the wider portion 406 of the respective plurality of elongated, tapering receipt apertures 179 of the bottom portion 168 of the bell crank assembly 164.

Referring to FIGS. 7C and 9-11, the bottom portion 168 of the bell crank assembly 164 may further include a bottom rear crank aperture 169 at a rear connection 185. The bell crank assembly 164 further includes the top portion 166 that may define a top rear crank aperture 167. A fastener connection may be disposed between the top rear crank aperture 167 of the top portion 166 that is aligned with the bottom rear crank aperture 169 of the bottom portion 168. The fastener connection is configured to connect the top portion 166 to the bottom portion 168 at the rear connection 185.

Referring to FIGS. 6-7D, the bell crank assembly 164 further includes the uppermost top component 310 aligned with and fastened to the top portion 166 through a center pin 312 disposed between respective center apertures of the uppermost top component 310 and the top portion 166 of the bell crank assembly 164.

Referring to FIGS. 7A-7D, the top portion 166 may further include an upper top component 180 on an upper plane, a lower top component 184 on a lower plane spaced from the upper plane, and an intermediate top component 182 disposed therebetween. The lower top component 184 may include the top rear crank aperture 167 configured to align with the bottom rear crank aperture 169 of the bottom portion 168 and connect the top portion 166 to the bottom portion 168 at the rear connection 185 through a fastener connection disposed therebetween.

In embodiments, each of the uppermost top component 310 and the top portion 166 include prongs extending in opposite outward directions from respective central portions including the respective center apertures. The top portion 166 includes a first prong 186 and a second prong 188, and the uppermost top component 310 includes a first prong 386 and a second prong 388. Each first prong 186, 386 respectively includes a first elongated prong aperture 190, 316, and each second prong 188, 388 respectively includes a second elongated prong aperture 192, 316. The first elongated prong apertures 190, 316 are configured to receive an outer pin 314 to fasten the first prongs 186, 386 of the top portion 166 and the uppermost top component 310 together, and the second elongated prong apertures 192, 316 are configured to receive another outer pin 314 to fasten the second prongs 188, 388 of the top portion 166 and the uppermost top component 310 together.

The bell crank assembly 164 may include a first actuation mechanism 160 and a second actuation mechanism 162, which may be solenoids, electromagnetic actuators, or other types of actuation assemblies configured to push and/or pull the bell crank assembly 164 to engage or disengage the top tool changer 198 from the bottom tool changer 200 depending on an actuation direction. While the first actuation mechanism 160 and the second actuation mechanism 162 may include pneumatic actuation, the first actuation mechanism 160 and the second actuation mechanism 162 may also operation without a need for pneumatics through use of, for example, solenoids, which eliminates a need for a pneumatic outlet to provide, for example, compressed air to be proximate and near to the bell crank assembly 164.

The first actuation mechanism 160 may include a central aperture sized to slidably receive a first actuation pin 170, and the second actuation mechanism 162 may include a central aperture sized to slidably receive a second actuation pin 172. Referring to FIGS. 7B and 7D, each of the first actuation pin 170 and the second actuation pin 172 includes ends defining a pair of aligned apertures 174 and a cutout portion 176 disposed therebetween. The pair of aligned apertures 174 of each of the first actuation pin 170 and the second actuation pin 172 is respectively aligned with and between each first elongated prong aperture 190, 316 and each second elongated prong aperture 192, 316 of respectively the top portion 166 and the uppermost top component 310 of the bell crank assembly 164.

FIG. 11 illustrates an embodiment of changes in force vectors due to implementation of the bell crank assembly 164 as described herein in the directions of arrows A, B, and D on the master printing tool coupling component 112, including the top tool changer 198, as shown in FIGS. 7A-7D. As a non-limiting example, FIG. 11 illustrates a general free body diagram of force transfer from the actuation mechanisms 160, 162 through the bell crank assembly 164 and into the top tool changer 198. Moreover, FIG. 11 depicts an example of the locked position L of FIGS. 7A and 9 and includes a width W1 in the x-direction and a length L1 in the y-direction between an aligned aperture 174 of the first actuation pin 170 and the center aperture 402 of the top tool changer 198. The width W1 in the position of FIG. 11 may be, for example, 18.225 mm, and the length L1 may be 13.7 mm. A width W2 is disposed between the center aperture 402 of the top tool changer 109 and a center of the rear connection 185 in the x-direction. The width W2 in the position of FIG. 11 may be, for example, 37.423 mm. A length L3 is disposed between the center aperture 402 of the top tool changer 109 and a center of the rear connection 185 in the y-direction. The length L3 in the position of FIG. 11 may be, for example, 6.599 mm. A width W3 is disposed between an aligned aperture 174 of the second actuation pin 172 and the center aperture 402 of the top tool changer 198 in the x-direction. The width W3 in the position of FIG. 11 may be, for example, 7.825 mm. A length L2 is disposed between an aligned aperture 174 of the second actuation pin 172 and the center aperture 402 of the top tool changer 198 in the y-direction. The length L2 in the position of FIG. 11 may be, for example, 13.7 mm.

A method or process for coupling 3D printing components of the 3D printing device 100 may include alignment of the top tool changer 198 of the first portion of a coupled tool assembly 126A with the bottom tool changer 200 of the second portion of the coupled tool assembly 126B along the z-axis in a wait position P2. As described above, the top tool changer 198 is housed in the bell crank assembly 164 of the first portion of a coupled tool assembly 126, and the bell crank assembly 164 includes the plurality of elongated, tapering receipt apertures 179 defined in the bottom portion 168 of the bell crank assembly 164. The top tool changer 198 is spaced from the bottom tool changer 200 at a distance in the wait position P2. The distance may be, as a non-limiting example, in a range of from about 20 mm to about 30, such as 25 mm. The bottom tool changer 200 includes the plurality of periphery protrusions 202 disposed around the bottom tool changer periphery, and the top tool changer 198 includes the plurality of periphery apertures 199 disposed around the top tool changer periphery and configured to receive the plurality of periphery protrusions 202 in a receipt position P3. The top tool changer 198 is lowered to the receipt position P3 in which the plurality of periphery apertures 199 of the top tool changer 198 and the plurality of elongated, tapering receipt apertures 179 of the bottom portion 168 of the bell crank assembly 164 receive the plurality of periphery protrusions 202 of the bottom tool changer 200.

The bell crank assembly 164 in the receipt position P3 is adjusted in a first direction, for example a counter-clockwise direction CC as shown in FIG. 10, to lock the top tool changer 198 to the bottom tool changer 200 in a locked position L as shown in FIG. 11 to form the coupled tool assembly 126 in which the first portion of the coupled tool assembly 126A is locked and coupled to the second portion of the coupled tool assembly 126B. Alternatively, the bell crank assembly 164 in the receipt position P3 when locked may be adjusted in a second direction opposite the first direction, such as a clockwise direction C as shown in FIG. 11, to unlock the top tool changer 198 from the bottom tool changer 200 in an unlocked position U as shown in FIG. 10 such that the first portion of the coupled tool assembly 126A is able to decouple from the second portion of the coupled tool assembly 126B.

In an embodiment, adjustment of the bell crank assembly 164 to the locked position L of FIG. 9 may include an adjustment of the rear connection 185 of the bell crank assembly 164 in the counter-clockwise direction CC such that the second actuation pin 172 extends away from the second actuation mechanism 162 at a rear portion 485 adjacent the rear connection 185 to pull each second prong 188, 388 of the bell crank assembly 164 toward the rear portion 485, and the first actuation pin 170 is pulled toward the first actuation mechanism 160 at the rear portion 485 to push each first prong 186, 386 of the bell crank assembly 164 away from the rear portion 485. In the locked position L of FIG. 9, each neck portion 302 (FIG. 8C) of each of the plurality of periphery protrusions 202 of the bottom tool changer 200 abuts walls defining the taper portion 404 of a respective plurality of elongated, tapering receipt apertures 179 (FIG. 7A) of the bottom portion 168 of the bell crank assembly 164.

Alternatively, adjustment of the bell crank assembly 164 to the unlocked position U of FIG. 10 may include an adjustment of the rear connection 185 of the bell crank assembly 164 in the clockwise direction C of FIG. 9 such that the second actuation pin 172 is pulled toward the second actuation mechanism 162 at the rear portion 485 adjacent the rear connection 185 to push each second prong 188, 388 of the bell crank assembly 164 away from the rear portion 485, and the first actuation pin 170 extends away from the first actuation mechanism 160 at the rear portion 485 to pull each first prong 186, 386 of the bell crank assembly 164 toward the rear portion 485. In the unlocked position U, each neck portion 302 (FIG. 8C) of each of the plurality of periphery protrusions 202 of the bottom tool changer 200 is spaced from walls defining the wider portion 406 of the respective plurality of elongated, tapering receipt apertures 179 (FIG. 7A) of the bottom portion 168 of the bell crank assembly 164.

In an embodiment, a system 400 for master printing tool coupling with the 3D printing device 100 to removably couple with a printing tool such as the printing tool 120 may include the memory 195, the one or more processors 194 communicatively coupled to the 3D printing device 100 and the memory 195, and machine readable instructions stored in the memory 195. The machine readable instructions may cause the system 400 to perform at least the following when executed by the one or more processors: position the first portion of the coupled tool assembly 126A slidably disposed on the rail 140 of the 3D printing device 100 aligned with the r-axis r̂ in a home position P1 on the rail 140, which home position P1 may be in a location above the rotary printing stage 106 of the 3D printing device 100. The instructions executed by the one or more processors 194 may further cause the system 400 to position a first bay 117F of the plurality of bays 117 of the rotatable tool carousel 114 adjacent the wait position P2 to align with the r-axis r̂ through rotation of the rotatable tool carousel 114 when another bay 117 is adjacent the wait position P2. The rail 140 may be lowered along the z-axis 2 to the receipt position P3 in which the top tool changer 198 of the first portion of the coupled tool assembly 126A couples with the bottom tool changer 200 of the second portion of the coupled tool assembly 126B, and the top tool changer 198 locked to the bottom tool changer 200 as described herein to form the coupled tool assembly 126.

As described above, the first portion of the coupled tool assembly 126A includes the print head 110 coupled to the master printing tool coupling component 112, and the master printing tool coupling component 112 includes the top tool changer 198. The second portion of the coupled tool assembly 126B includes the printing tool 120 and the printing tool body 122 that includes the bottom tool changer 200. The printing tool 120 may be disposed on the rotatable tool carousel 114 of the 3D printing device 100 through removable attachment by the printing tool body 122. The wait position P2 may be adjacent to the rotatable tool carousel 114 that is rotatably coupled to the base 102, spaced from the rail 140, and that includes the plurality of bays 117 configured to house and removably attach to a respective plurality of printing tools 120. The z-axes of the top tool changer 198 and the bottom tool changer 200 are spaced and aligned in the wait position P2.

The system 400 may further include machine readable instructions executable by the one or more processors 194 for calibration. By way of example and not as a limitation, the instructions may be to move the coupled tool assembly 126 on the rail 140 along the r-axis r̂ toward the rotary printing stage 106 to a tool clearance position P4 at which the coupled tool assembly 126 is clear of the rotatable tool carousel 114. The rotatable tool carousel 114 may then be rotated to the position to avoid interference with the rotary printing stage 106 during printing on the rotary printing stage 106 by the coupled tool assembly 126. The coupled tool assembly 126 may be moved to the tip detect location 152, and a tip of the coupled tool assembly 126 calibrated at the tip detect location 152 with a tip calibration prior to printing. The coupled tool assembly 126 may then slide to the home position P1 upon the tip calibration, such that the coupled tool assembly 126 with the tip calibration is configured for 3D printing on the rotary printing stage 106.

In an embodiment, instructions to move the first portion of the coupled tool assembly 126A along the rail 140 to the wait position P2 may include instructions to slide the first portion of the coupled tool assembly 126A on the rail 140 along the r-axis r̂ toward the rotatable tool carousel 114 and slide the rail 140 down the pair of towers 130 along the z-axis ẑ until reaching the wait position P2.

While a tool pick-up process is described above, similarly, a tool drop-off process may be employed by the 3D printing device 100. As a non-limiting example, the system 400 may further include machine readable instructions executable by the one or more processors 194 to, upon 3D print completion, move the coupled tool assembly 126 on the rail 140 along the r-axis r̂ toward the home position P1 when the coupled tool assembly 126 is spaced away from the home position P1. The coupled tool assembly 126 is then moved on the rail 140 along the r-axis r̂ to wait at the tool clearance position P4.

The first bay 117F of the plurality of bays 117 of the rotatable tool carousel 114 is positioned adjacent the wait position P2 to align with the r-axis r̂ through rotation of the rotatable tool carousel 114 when another bay 117 is adjacent the wait position P2. The coupled tool assembly 126 is moved on the rail 140 along the r-axis r̂ toward the receipt position P3. The top tool changer 198 is unlocked from the bottom tool changer 200 to decouple the first portion of the coupled tool assembly 126A from the second portion of the coupled tool assembly 126B as described herein. The second portion of the coupled tool assembly 126A is attached to the first bay 117F. The first portion of the coupled tool assembly 126 disposed on the rail 140 is moved upward along the pair of towers 130 along the z-axis ẑ to the wait position P2. The first portion of the coupled tool assembly 126A is then moved on the rail 140 along the r-axis r̂ toward the rotary printing stage 106 to the tool clearance position P4 at which the first portion of the coupled tool assembly 126A is clear of the rotatable tool carousel 114. The rotatable tool carousel 114 is then rotated to the position to avoid interference with the rotary printing stage 106 during printing on the rotary printing stage 106 by the first portion of the coupled tool assembly 126A.

The system 400 may further include machine readable instructions executable by the one or more processors 194 to move the first portion of the coupled tool assembly 126A to the tip detect location 152 when, as a non-limiting example, a print control requires use of the print head 110 including a fused deposition modeling (FDM) tool that includes a FDM nozzle. At the tip detect location 152, a tip of the FDM nozzle of the first portion of the coupled tool assembly 126A may be calibrated prior to printing. The first portion of the coupled tool assembly 126A may slide to the home position P1 upon the tip calibration. The 3D printing device 100 may 3D print onto the rotary printing stage 106 through use of the first portion of the coupled tool assembly 126A. Upon 3D print completion, the first portion of the coupled tool assembly 126A may be moved on the rail 140 along the r-axis r̂ toward the home position P1 when the first portion of the coupled tool assembly 126A is spaced away from the home position P1.

The communicative coupling described herein for the system 400 may be through a communication path formed from any medium capable of transmitting and/or exchanging a signal or combinations thereof such as, for example, conductive wires, conductive traces, optical waveguides, or the like. The one or more processor 194 may include a controller, an integrated chip, a microchip, a computer, or any other computing device. The memory 195 may be a non-transitory computer readable medium and may be configured as nonvolatile or a volatile computer readable medium and may include or be communicatively coupled to one or more databases. The memory 195 may include RAM, ROM, flash memories, hard drives, or any device capable of storing machine readable instructions for access and execution by the one or more processors 194.

Such machine readable instructions may include logic and algorithm(s), as described in greater detail further below, written in any programming language such as, for example, machine language that may be directly executed by the one or more processors 194, or assembly language, object-oriented programming (OOP), scripting languages, microcode, and the like, that may be compiled or assembled into machine readable instructions and stored in the memory 195. Alternatively, the machine readable instructions may be written in a hardware description language (HDL), such as logic implemented via either a field-programmable gate array (FPGA) configuration or an application-specific integrated circuit (ASIC), or their equivalents. According, the methods and systems described herein may be implemented in any conventional computer programming language, as pre-programmed hardware elements, or as a combination of hardware and software elements.

The 3D printing device 100 may include network interface hardware such as a transmitter and/or receiver to send/receive data according to any wireless or wired communication and for communicatively coupling with a computer network and the one or more processors 194. For example, the network interface hardware may include a chipset (e.g., antenna, processors, machine readable instructions, etc.) to communicate over wired and/or wireless computer networks such as, for example, wireless fidelity (Wi-Fi), WiMax, Bluetooth, IrDA, Wireless USB, Z-Wave, ZigBee, or the like.

The 3D printing device systems describe herein may implement the computer and software based methods described herein and may allow for a smaller printing footprint aiding a portable design, which design may include handles disposed on enclosure sides of the base 102 of the 3D printing device 100. With such handles, a user may easily carry the 3D printing device 100 from a benchtop to, for example, a sterile bio-hood. Further, the 3D printing device 100 may include integrated 3D scanning with a rotating build platform that allows for an easy addition of a scanning platform to be placed adjacent to a unit Z-axis that may assist with, for example, the scanning and replication of medical devices and implants. Further, the 3D printing device 100 may be utilized with custom tools developed to meet user needs that meet the overall size envelope that prevents carousel and print head interferences. Furthermore, the 3D printing device 100 includes an open print space that provides improved airflow characteristics that reduces potential turbulence when placed in the sterile bio-hood.

For the purposes of describing and defining the present disclosure, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed disclosure or to imply that certain features are critical, essential, or even important to the structure or function of the claimed disclosure. Rather, these terms are merely intended to identify particular aspects of an embodiment of the present disclosure or to emphasize alternative or additional features that may or may not be utilized in a particular embodiment of the present disclosure.

For the purposes of describing and defining the present disclosure it is noted that the terms "substantially" and "approximately" are utilized herein to represent the inherent degree of uncertainty that may be attributed to any quantitative comparison, value, measurement, or other representation. The terms "substantially" and "approximately" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present disclosure, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A 3D printing device defined by a polar coordinate frame including an r-axis, a z-axis, and a rotational theta axis, the 3D printing device comprising:
   a base including a top surface;
   a rotary printing stage rotatably attached to the top surface of the base and configured to rotate between ends of the rotational theta axis;
   a pair of towers disposed along a pair of axes aligned with the z-axis;
   a rail disposed along the r-axis and slidably coupled to the pair of towers to slide along the z-axis;
   a print head slidably disposed on the rail;
   a master printing tool coupling component joined to the print head to form a first portion of a coupled tool assembly; and
   a rotatable tool carousel rotatably coupled to the base, the rotatable tool carousel including a plurality of bays to removably house a respective plurality of printing tools, each printing tool including a printing tool body to form a second portion of the coupled tool assembly, the printing tool body configured to couple with the master printing tool coupling component to form the coupled tool assembly wherein the first portion of the coupled tool assembly is locked and coupled to the second portion of the coupled tool assembly such that the printing tool is removable from a respective bay of the plurality of bays that houses the printing tool when the coupled tool assembly moves along the r-axis in a direction opposite from the rotatable tool carousel.

2. The 3D printing device of claim 1, wherein the first portion of the coupled tool assembly comprises a mechanical actuation assembly and a top tool changer, and the second portion of the coupled tool assembly comprises a bottom tool changer configured to couple with the top tool changer by the mechanical actuation assembly configured to lock or unlock the bottom tool changer and the top tool changer together.

3. The 3D printing device of claim 2, wherein
   wherein the mechanical actuation assembly may be one of a motor/clutch assembly and a bell crank assembly with the top tool changer housed in the bell crank assembly,
   the bottom tool changer comprises a plurality of periphery protrusions disposed around a bottom tool changer periphery, and
   the top tool changer comprises a plurality of periphery apertures disposed around a top tool changer periphery and configured to receive the plurality of periphery protrusions.

4. The 3D printing device of claim 3, wherein the bell crank assembly comprises a bottom portion and a plurality of elongated, tapering receipt apertures defined in the bottom portion of the bell crank assembly and configured to receive the plurality of periphery protrusions of the bottom tool changer.

5. The 3D printing device of claim 4, wherein:
   each of the plurality of periphery protrusions of the bottom tool changer comprises a neck portion attached to a head portion, the head portion having a head diameter that is larger than a neck diameter of the neck portion,
   each of the plurality of elongated, tapering receipt apertures of the bottom portion of the bell crank assembly comprises a taper portion and a wider portion, the taper portion having a taper portion width that is smaller than a wider portion width of the wider portion, the wider portion configured to receive the head portion of one of the plurality of periphery protrusions of the bottom tool changer, the taper portion width smaller than the head diameter of the head portion, and
   in a locked position, each neck portion of each of the plurality of periphery protrusions of the bottom tool changer abuts walls defining the taper portion of the respective plurality of elongated, tapering receipt apertures of the bottom portion of the bell crank assembly, and in an unlocked position, each neck portion of each of the plurality of periphery protrusions of the bottom tool changer is spaced from walls defining the wider portion of the respective plurality of elongated, tapering receipt apertures of the bottom portion of the bell crank assembly.

6. The 3D printing device of claim 4, wherein the bottom portion comprises a bottom rear crank aperture at a rear connection, and the bell crank assembly further comprises a top portion defining a top rear crank aperture, and a fastener connection disposed between the top rear crank aperture of the top portion aligned with the bottom rear crank aperture of the bottom portion, the fastener connection configured to connect the top portion to the bottom portion at the rear connection.

7. The 3D printing device of claim 4, wherein the bell crank assembly further comprises a top portion and an uppermost top component aligned with and fastened to the top portion through a center pin disposed between respective center apertures of the uppermost top component and the top portion of the bell crank assembly.

8. The 3D printing device of claim 7, wherein the top portion comprises an upper top component on an upper plane, a lower top component on a lower plane spaced from the upper plane, and an intermediate top component disposed therebetween, the lower top component comprising a top rear crank aperture configured to align with a bottom rear crank aperture of the bottom portion and connect the top portion to the bottom portion at a rear connection through a fastener connection disposed therebetween.

9. The 3D printing device of claim 8, wherein each of the uppermost top component and the top portion comprises a first prong and a second prong extending in opposite outward directions from respective central portions including the respective center apertures, each first prong comprising a first elongated prong aperture, and each second prong comprising a second elongated prong aperture.

10. The 3D printing device of claim 9, wherein the bell crank assembly comprises a first actuation mechanism and a second actuation mechanism, the first actuation mechanism comprising a central aperture sized to slidably receive a first actuation pin, the second actuation mechanism comprising a central aperture sized to slidably receive a second actuation pin, each of the first actuation pin and the second actuation pin comprising ends defining a pair of aligned apertures and a cutout portion disposed therebetween.

11. The 3D printing device of claim 10, wherein the pair of aligned apertures of each of the first actuation pin and the second actuation pin is respectively aligned with and between each first elongated prong aperture and each second elongated prong aperture.

* * * * *